United States Patent [19]
Fisher et al.

[11] Patent Number: 6,052,460
[45] Date of Patent: Apr. 18, 2000

[54] ARRANGEMENT FOR EQUALIZING LEVELS OF SERVICE AMONG SKILLS

[75] Inventors: Thomas S. Fisher; Roy A. Jensen, both of Westminster, Colo.; Martin I. Reiman, Maplewood, N.J.

[73] Assignee: Lucent Technologies Inc., Murray Hill, N.J.

[21] Appl. No.: 08/992,837

[22] Filed: Dec. 17, 1997

[51] Int. Cl.[7] .................................................. H04Q 3/64
[52] U.S. Cl. ........................... 379/266; 379/265; 379/309
[58] Field of Search ................................... 379/265, 266, 379/309

[56] References Cited

U.S. PATENT DOCUMENTS

| | | | |
|---|---|---|---|
| 5,206,903 | 4/1993 | Kohler et al. ........................... | 379/309 |
| 5,309,513 | 5/1994 | Rose ........................................ | 379/265 |
| 5,467,391 | 11/1995 | Donaghue, Jr. et al. ................ | 379/265 |
| 5,721,770 | 2/1998 | Kohler ..................................... | 379/266 |
| 5,825,869 | 10/1998 | Brooks et al. ........................... | 379/265 |
| 5,828,747 | 10/1998 | Fisher et al. ............................. | 379/309 |
| 5,903,641 | 5/1999 | Tonisson ................................... | 379/266 |

FOREIGN PATENT DOCUMENTS

| | | | |
|---|---|---|---|
| 0701358 | 3/1996 | European Pat. Off. ......... | H04M 3/42 |
| 0740450 | 10/1996 | European Pat. Off. ......... | H04M 3/50 |
| 0817455 | 1/1998 | European Pat. Off. ......... | H04M 3/50 |

OTHER PUBLICATIONS

U.S. application No. 08/674,477, J. E. Kohler 5, filed Jul. 2, 1996, "Agent Vectoring".

U.S. application No. 08/790,010, A. V. Tonisson 1, filed Jan. 28, 1997, "Automatic Dynamic Changing of Agents' Call–Handling Assignments".

Definity[R] Communications System Generic 3 Call Vectoring/Expert Agent Selection (EAS) Guide, 555–230–520, Issue 3, Nov. 1993, 43 pages.

*Primary Examiner*—Krista Zele
*Assistant Examiner*—Roland G. Foster
*Attorney, Agent, or Firm*—David Volejnicek

[57] ABSTRACT

In a skills-based ACD, an agent is selected to handle a call based on which available agent's handling of the call will produce the least deviation from the agent's target performance criteria, and a call is selected for handling by an agent based on which available call's handling will produce the least deviation from the agent's target performance criteria. Illustrative target performance criteria include target per-agent per-skill skill work time to staff time ratios. Moreover, the selected call is left waiting and the selected agent is left idle if handling of the call by the agent would increase deviation from the agent's target performance criteria. This serves to equalize the levels of service given to small skills (those staffed with few agents) and large skills (those staffed with many agents).

25 Claims, 5 Drawing Sheets

ARRANGEMENT FOR EQUALIZING LEVELS OF SERVICE AMONG SKILLS

TECHNICAL FIELD

This invention relates to automatic call distribution (ACD) systems, also variously referred to as call centers or telemarketing systems.

BACKGROUND OF THE INVENTION

ACD systems distribute calls—whether inbound or outbound —for handling to any suitable ones of available call-handling agents according to some predefined criteria. In many existing systems, such as the Lucent Technologies Definity® ACD system, the criteria for handling the call from the moment that the ACD system becomes aware of the call until the call is connected to an agent are customer-specifiable (i.e., programmable by the operator of the ACD system) via a capability called call vectoring. Normally in present-day ACD systems, when the ACD system's controller detects that an agent has become available to handle a call, the controller identifies all predefined call-handling skills of the agent (usually in some order of priority) and delivers to the agent the highest-priority oldest-waiting call that matches the agent's highest-priority skill. Generally the only condition that results in a call not being delivered to an available agent is that there are no calls waiting to be handled.

In many call centers, agents are members of multiple skills (i.e., multiple agent splits corresponding to different agent skills). Some of these skills (e.g., general sales or inquiry skills) have many agent members while others (e.g., specialized sales or inquiry skills, non-native language skills, etc.) have only a few agent members. In these situations, the expectation is that the multi-skill agents will spend most of their time handling calls in the smaller, specialized, skills while backing up the larger, general-purpose, skills. Furthermore, the same level of service is desired across all skills. This is typically expressed as a percentage of calls answered within a specified time interval; 80 percent in 20 seconds is an industry standard.

In such call centers, however, callers to the larger skills experience a higher quality or level of service than callers to the smaller skills. All other things being equal, this is due to the number of agents in the skills: the more agents there are in a skill, the higher is the level of service provided.

A way to equalize the level of service provided to smaller skills is to overstaff these skills, either by adding agents that have only the specialized skills or by moving the agents from the larger skills. Either solution is costly and inefficient; additional training resources are also required.

SUMMARY OF THE INVENTION

This invention is directed to solving these and other problems and disadvantages of the prior art. According to one aspect of the invention, in response to an available call that needs a particular skill for its handling, a call handler—e.g., an ACD agent—who posesses the needed skill is selected to handle the call based on which available call handler's handling of the call will produce the least deviation (e.g., sum-of-squares deviation, or variance) from target performance criteria. Specifically, from among a plurality of available call handlers having the needed skill, the one is selected whose handling of the call would result in a smallest total deviation of per-skill ratios (e.g., percentages) of an amount of time spent by the call handler in handling calls needing an individual skill (skill work time) and a total amount of time spent by the call handler in handling calls (staff time) from target per-skill ratios (e.g., percentages) of skill work time and staff time. The selected call handler is then assigned to handle the call.

Preferably, before the selected call handler is assigned to handle the call, a determination is made of whether the assignment would increase deviation from target performance criteria. Specifically, a determination is made of whether the selected call handler's skill work time exceeds a target skill work time, and the assignment is made if it is determined that the skill work time does not exceed the target skill work time. If it is determined that the skill work time does exceed the target skill work time, the assignment is not made, e.g., the call is left waiting for another call handler and the selected call handler is left idle.

According to another aspect of the invention, in response to an available call handler having a plurality of skills for handling calls, a call needing one of those skills is selected for handling by the call handler based on which available call's handling will produce the least deviation from the target performance criteria. Specifically, from among a plurality of available calls that need different ones of the call handler's skills, the one is selected whose handling by the call handler would result in a smallest total deviation of per-skill ratios (e.g., percentages) of an amount of time spent by the call handler in handling calls needing an individual skill of the call handler (skill work time) and a total amount of time spent by the call handler in handling calls (staff time) from per-skill target ratios (e.g., percentages) of skill work time and staff time. The call handler is then assigned to handle the selected call.

Preferably, before the call handler is assigned to handle the selected call, a determination is made of whether the assignment would increase deviation from the target performance criteria. Specifically, a determination is made of whether the call handler's skill work time exceeds a target skill work time for the skill needed by the selected call, and the assignment is made if it is determined that the skill work time does not exceed the target skill work time. If it is determined that the skill work time does exceed the target skill work time, the assignment is not made, e.g., the selected call is left waiting for another call handler and the call handler is left idle.

The invention encompasses both a method and an apparatus as well as a device. While the method comprises the steps of the just-characterized procedure, the apparatus effects the method steps. The apparatus preferably includes an effector—any entity that effects the corresponding step, unlike a means—for each of the steps. Further, the device comprises a computer-readable medium containing software which, when executed in a computer, causes the computer to perform the method steps.

This invention provides a way of equalizing the quality or level of service provided to larger and smaller skills, eliminating the need to overstaff the smaller skills and thus reducing the costs associated with overstaffing (both actual costs and indirect costs such as training, etc.).

By automatically reserving an agent—holding the agent back from serving a call—when a predefined performance condition is met serves to increase the idle time of agents in smaller skills, and this tends to equalize the level of service provided to smaller skills relative to larger skills. In this situation, one or more agents are idle even though calls are waiting in one or more of the skills assigned to these agents. This is a radical departure from present call-center practice of leaving no agents idle when there are calls in queue.

Predefined percentage allocations for each of an agent's assigned skills can be used as the performance condition to determine when an agent should be automatically reserved. During call selection, if the call selected is from a skill in which the agent is already at or above a predefined percentage (which can be less than, equal to, or greater than 100 percent) of the agent's percentage allocation for that skill, the call is not selected (i.e., it remains enqueued) and the agent becomes idle waiting for a new call arrival in one of the agent's assigned skills. During agent selection, if the agent selected is already at or above a predefined percentage (which can again be less than, equal to, or greater than 100 percent) of the agent's percentage allocation for the skill, the call is enqueued waiting for another agent in the skill to become available. The agent remains idle waiting for a new call arrival in one of the agent's assigned skills.

These and other features and advantages of the present invention will become more apparent from the following description of an illustrative embodiment of the invention considered together with the drawing.

DETAILED DESCRIPTION

Figure 1:
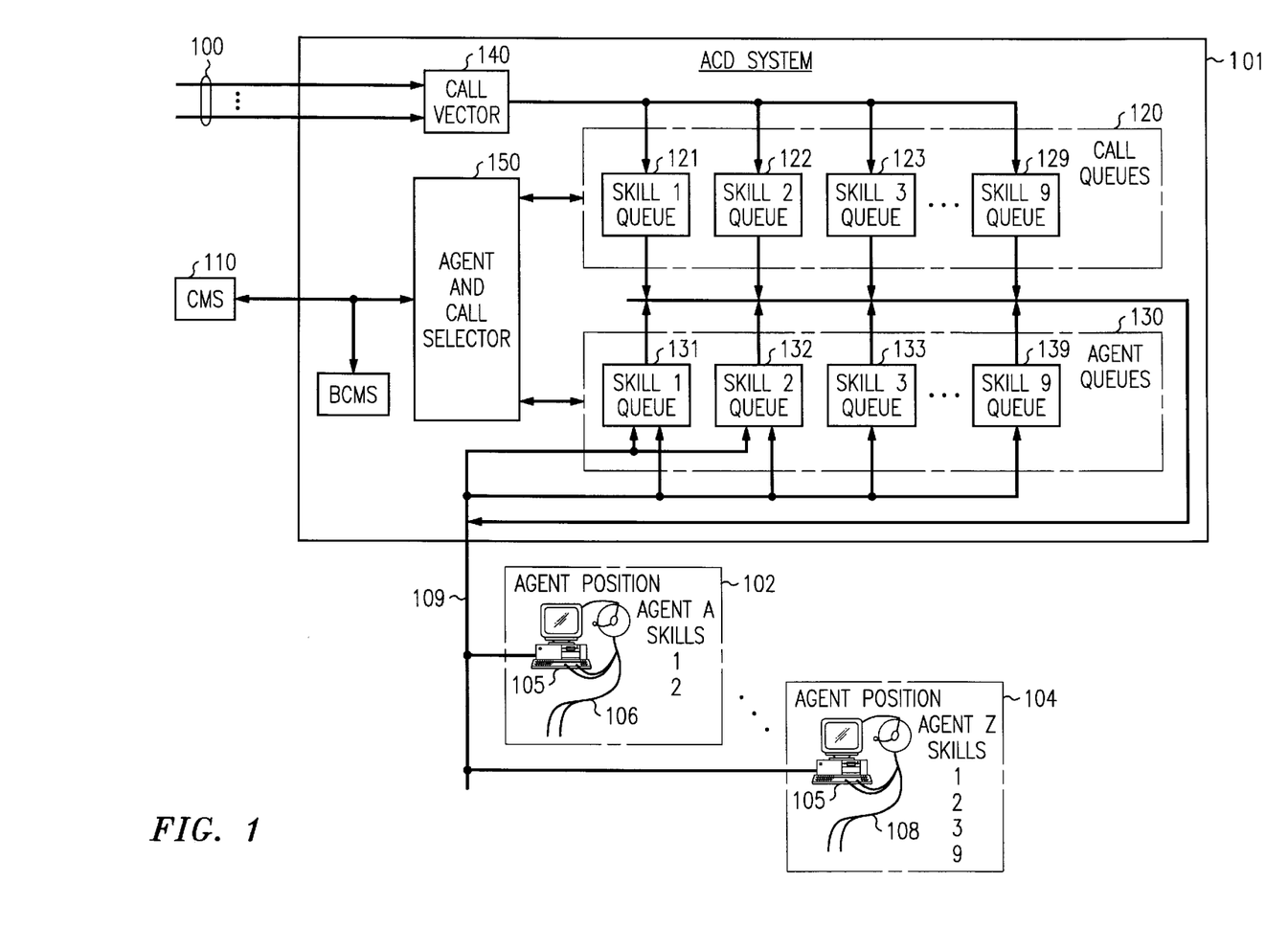
FIG. 1 is a block diagram of a call center that includes an illustrative embodiment of the invention.

FIG. 1 shows an illustrative call center. As is conventional, the call center comprises a plurality of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. Terminals 105 are connected to ACD system 101 by a voice-and-data transmission medium 109. Also, included in ACD system 101 is a conventional basic call management system (BCMS) and connected to ACD system 101 is a conventional call management system (CMS) 110 that gather call records and call-center statistics for use in managing the call center and in generating call-center reports. CMS and BCMS will hereafter be referred to jointly as CMS 110.

ACD system 101 is illustratively the Lucent Technologies Definity® private-branch exchange (PBX)-based ACD system. It is a stored-program-controlled system that conventionally includes interfaces to external communications links, a communications switching fabric, service circuits (e.g., tone generators, announcement circuits, etc.), memory for storing control programs and data, and a processor (i.e., a computer) for executing the stored control programs to control the interfaces and the fabric and to provide automatic call-distribution functionality. Included among the data stored in ACD system 101 are a set of call queues 120 and a set of agent queues 130. Each call queue 121–129 corresponds to a different agent skill, as does each agent queue 131–139. Conventionally, calls are prioritized, and either are enqueued in individual ones of call queues 120 in their order of priority or are enqueued in different ones of a plurality of call queues that correspond to a skill and each one of which corresponds to a different priority. Likewise, each agent's skills are prioritized according to his or her level of expertise in that skill, and either agents are enqueued in individual ones of agent queues 130 in their order of expertise level or are enqueued in different ones of a plurality of agent queues that correspond to a skill and each one of which corresponds to a different expertise level. Included among the control programs in ACD system 101 is a call vector 140. Calls incoming to the call center on lines or trunks 100 are assigned by call vector 140 to different call queues 121–129 based upon the agent skill that they require for their proper handling. Agents 106–108 who are available for handling calls are assigned to agent queues 131–139 based upon the skills which they possess. An agent may have multiple skills, and hence may be assigned to multiple agent queues 131–139 simultaneously. Furthermore, an agent may have different levels of skill expertise (e.g., skill levels 1–16 in one known system or merely primary (P) skills and secondary (S) skills in another known system), and hence may be assigned to different agent queues 131–139 at different expertise levels. Call vectoring is described in DEFINITY® Communications System Generic 3 Call Vectoring/Expert Agent Selection (EAS) Guide, AT&T publication no. 555-230-520 (Issue 3, November 1993). Skills-based ACD is described in further detail in U.S. Pat. No. 5,206,903.

According to the invention, included among the programs executing on ACD system 101 is an agent and call selector 150. Selector 150 is stored either in the main memory or in a peripheral memory (e.g., disk, CD ROM, etc.) or some other computer-readable medium of ACD system 101. Selector 150 effects an assignment between available calls and available agents in a way that tends to equalize the level of service provided to smaller (less-often needed and therefore staffed by fewer agents) skills with that provided to larger skills.

Figure 2:
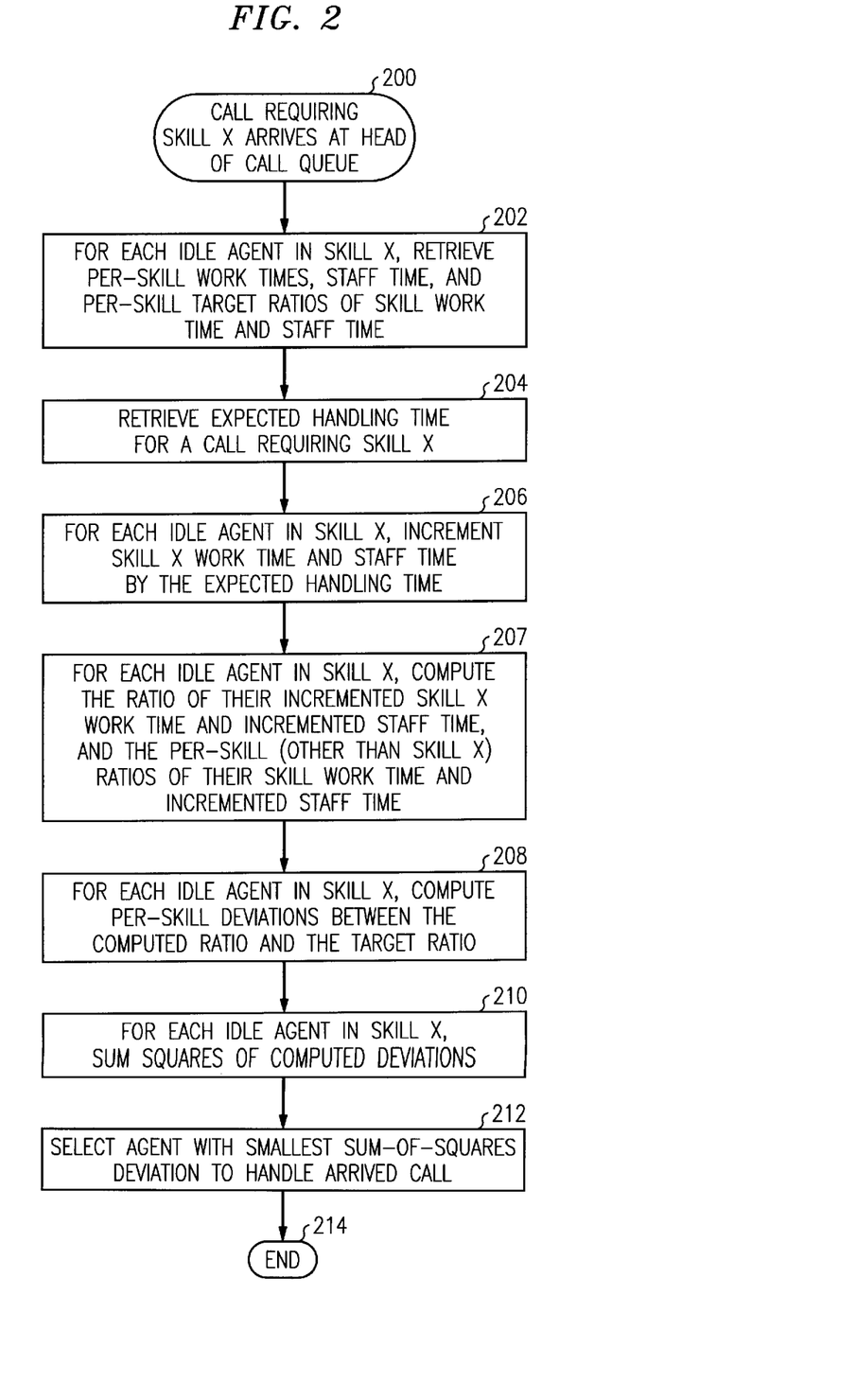
FIGS. 2 and 3 are functional flow diagrams of agent-selection and call-selection procedures, respectively, of a first illustrative embodiment of an agent and call selector of the call center of FIG. 1.
Figure 3:
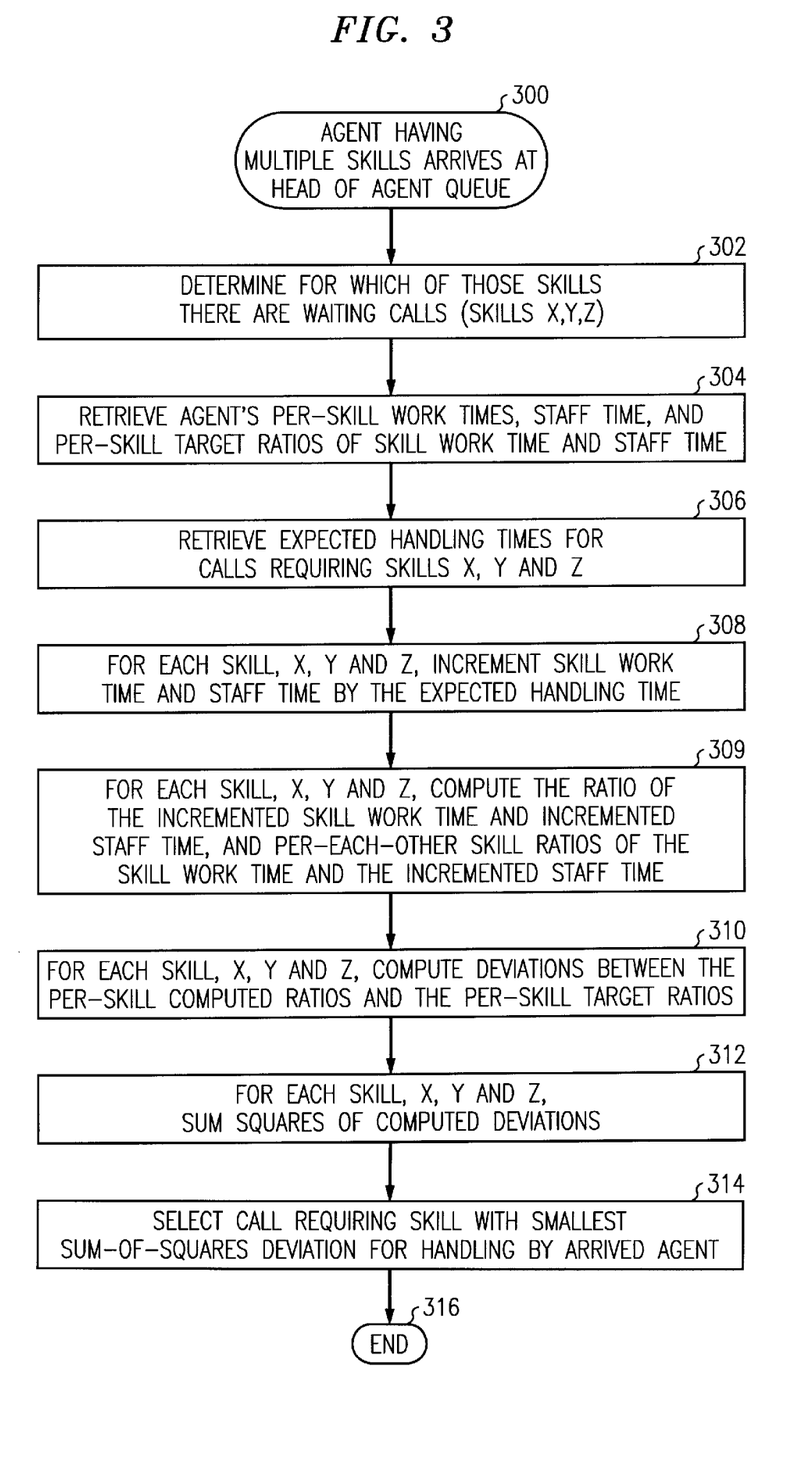

The functionality implemented by a first illustrative embodiment of selector 150 is shown in FIGS. 2 and 3. FIG. 2 shows the agent-selection procedure, which is performed by selector 150 when a call that is determined to require a skill x for its handling becomes available (i.e., arrives at the head of skill x queue in call queues 120, for purposes of this example), at step 200. In response, selector 150 selects the best idle agent with skill x to handle the call, as follows. For each idle agent with skill x (i.e., for each agent in skill x queue), selector 150 retrieves from storage the total time that the agent has spent handling calls requiring each of his or her skills (per-skill times), the total time that the agent has been handling calls (staff time), and the (administratively-specified) per-skill target ratios of skill work time and staff time, at step 202. Selector 150 also retrieves from storage the expected (e.g., average) handling time for a call requiring skill x (skill x call time), at step 204. Then, for each of the idle agents with skill x, selector 150 increments their skill x time and their staff time by the expected skill x call time, at step 206. Then, for each of the idle agents with skill x, selector computes a ratio of their incremented skill x work time and their incremented staff time and per-skill (other than skill x) ratios of their skill work time and their incremented staff time, at step 207. For example, if an agent has skills x, y, and z, selector 150 will compute the ratios: incremented skill x time/incremented staff time; skill y time/incremented staff time; and skill z time/incremented staff time. Finally, selector 150 computes the per-skill deviations between the computed ratio and the target ratio, at step 208. Selector 150 then combines (e.g., sums the squares of) the computed deviations for each idle agent with skill x, at step 210, and selects the idle agent whose combined deviation is the lowest, at step 212. The call is assigned to the selected agent for handling, and selector 150 then ends the agent-selection procedure, at step 214.

FIG. 3 shows the call-selection procedure, which is performed by selector 150 when an agent with multiple skills becomes available (i.e., arrives at the head of an agent queue in agent queues 130, for purposes of this example), at step 300. In response, selector 150 selects for the agent the best waiting call needing one of the agent's skills, as follows. Selector 150 determines for which of the agent's skills there are waiting calls, at step 302. Illustratively, assume that there are calls determined to be waiting for the agent's skills x, y, and z, but not w. Then, for each skill x, y, and z, selector 150 retrieves from storage the agent's per-skill skill work times, the agent's staff time, and the per-skill target ratios of skill work time and staff time, at step 304. Selector 150 further retrieves from storage the expected handling time for calls requiring skill x, y, and z, at step 306. Then, separately for each of the skills x, y, and z, selector 150 increments the agent's skill work time and staff time by the expected call time, at step 308. Then, separately for each of the skills x, y, and z, selector 150 computes a ratio of their incremented skill work time and their incremented staff time and per-each-other skill ratios of their skill work time and their incremented staff time, at step 309. For example, if an agent has skills x, y, w, and z selector 150 will compute the following ratios. For skill x, selector 150 will compute: skill x work time incremented by skill x handling time/staff time incremented by skill x handling time; skill y work time/staff time incremented by skill x handling time; skill w work time/staff time incremented by skill x handling time; and skill z work time/staff time incremented by skill x handling time. For skill y, selector 150 will compute: skill y work time incremented by skill y handling time/staff time incremented by skill y handling time; skill x work time/staff time incremented by skill y handling time; skill w work time/staff time incremented by skill y handling time; and skill z work time/staff time incremented by skill y handling time. And for skill z, selector 150 will compute: skill z work time incremented by skill z handling time/staff time incremented by skill z handling time; skill x work time/staff time incremented by skill z handling time; skill y work time/staff time incremented by skill z handling time; and skill w work time/staff time incremented by skill z handling time. Finally, selector 150 computes the deviations between the per-skill computed ratios and the per-skill target ratios, at step 310. Selector 150 then combines (e.g., sums the squares of) the computed deviations for each skill x, y, and z, at step 312, and selects a call requiring the one of the skills x, y, and z with the smallest combined deviation for handling by the agent, at step 314. The selected call is assigned to the agent for handling, and selector 150 then ends the call-selection procedure, at step 316.

The implementation of FIGS. 2 and 3 seeks to minimize deviation of the target performances of agents from their actual performances on a per-skill basis, thereby equalizing the levels of service given to the various skills. However, a more effective way of equalizing the levels of service given to various skills is to increase the idle time of agents who serve the smaller skills. (This is effectively what call-center managers do when they overstaff smaller skills.) Instead of overstaffing smaller skills, however, a better way to increase the idle time of agents in the smaller skills is to automatically hold some agents in reserve when their performance meets a predefined target. In this situation, one or more agents may be idle even though calls are waiting in one or more of the skill queues served by these agents. This is a radical departure from present call-center practice and violates the present performance optimization principle that no agents should be idle when there are calls waiting. This functionality is implemented by a second illustrative embodiment of selector 150, which is shown in FIGS. 4 and 5.

Figure 4:
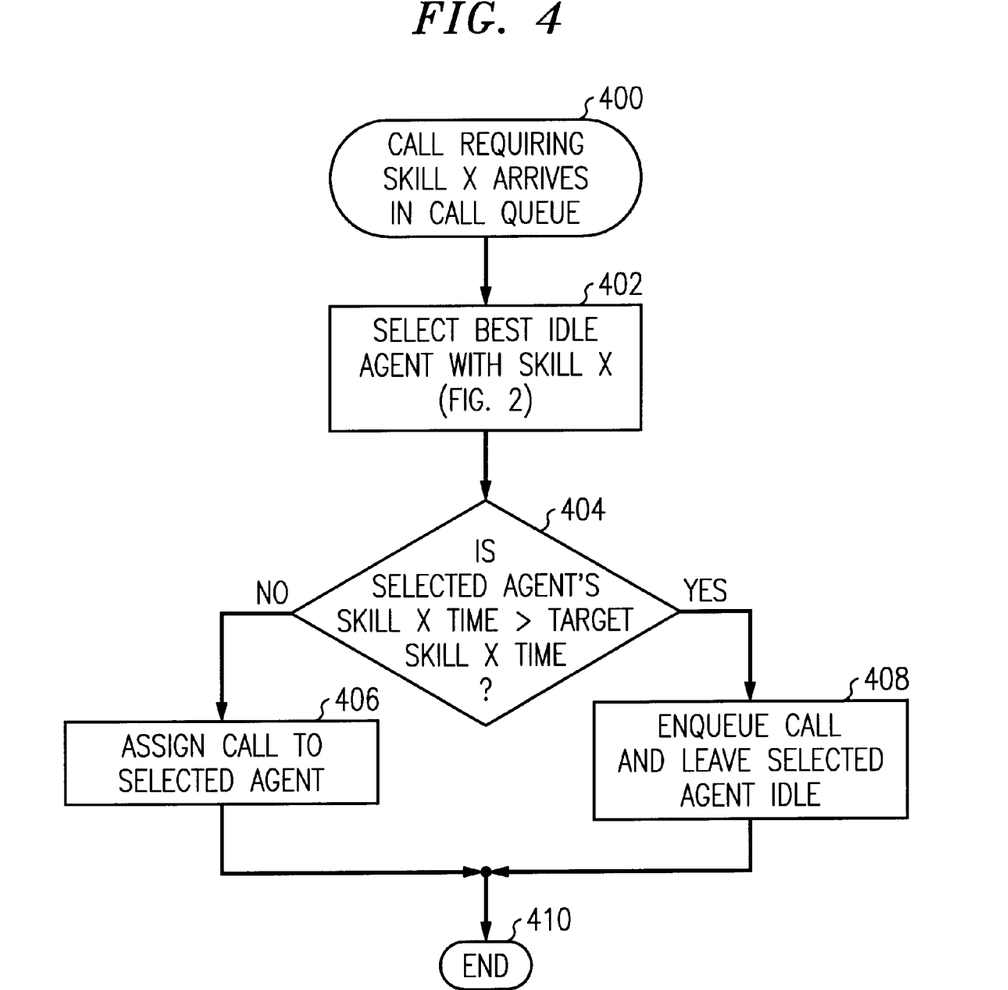
FIGS. 4 and 5 are functional flow diagrams of agent-selection and call-selection procedures, respectively, of a second illustrative embodiment of the agent and call selector of the call center of FIG. 1

FIG. 4 shows the agent-selection procedure, which is performed by selector 150 when a new call that is determined to require a skill x for its handling becomes available (i.e., arrives at ACD system 101, and more precisely at skill x queue in call queues 120, for purposes of this example), at step 400. In response, selector 150 selects the best idle agent in skill x, at step 402, in the manner shown in FIG. 2 and described above. Having selected the best idle agent, selector 150 now checks whether that agent's skill x work time exceeds that agent's (administratively-specified) target skill x work time, at step 404. If not, the is selected agent is assigned to handle the call, at step 406, and the agent-selection procedure is ended, at step 410. But if the agent's skill x work time exceeds the agent's target skill x work time, selector 150 causes the call to be enqueued in the skill x call queue and the agent to remain idle and enqueued in agent queues 130 that correspond to the agent's skills, at step 408. The agent-selection procedure then ends, at step 410.

Figure 5:
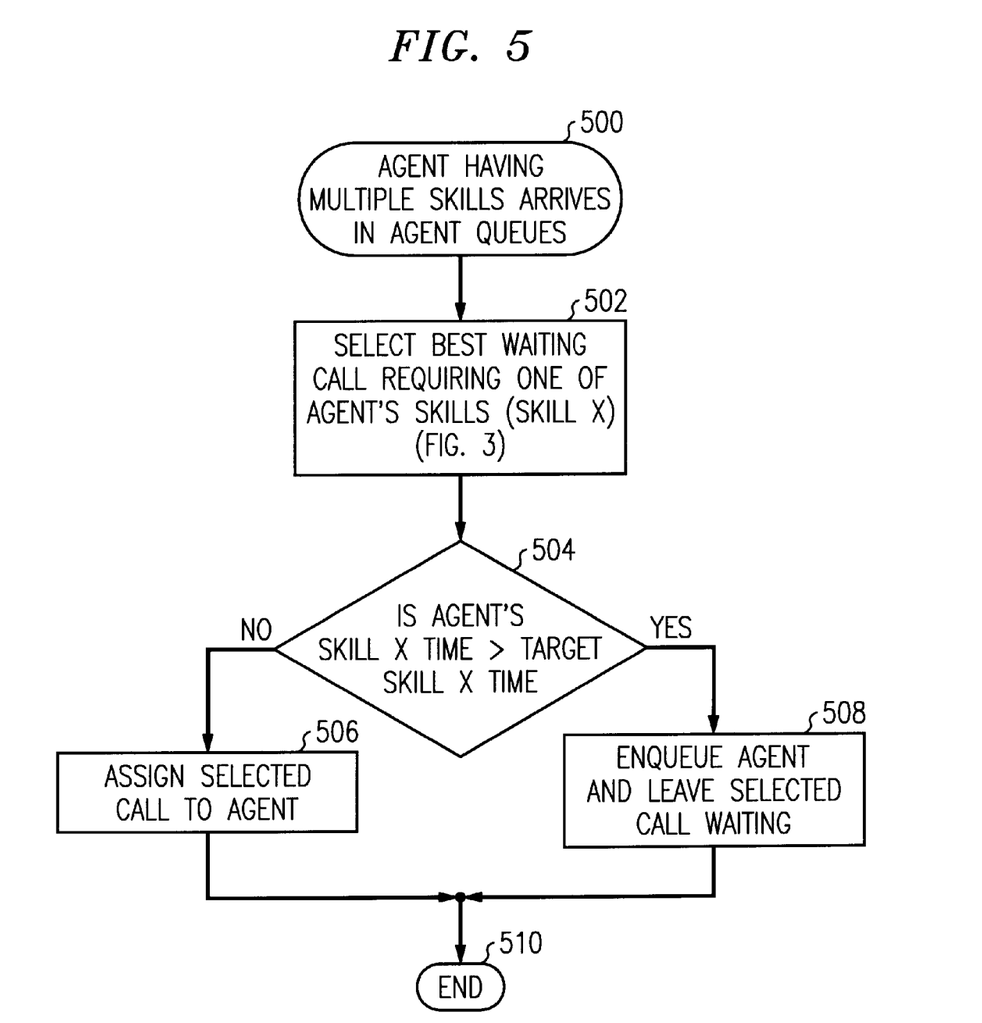

FIG. 5 shows the call-selection procedure, which is performed by selector 150 when an agent with multiple skills becomes available (i.e., becomes idle, and more precisely arrives at agent queues 130, for purposes of this example), at step 500. In response, selector 150 selects the best waiting call needing one of the agent's skills, at step 502, in the manner shown in FIG. 3 and described above. Illustratively, assume that the selected call is one requiring the agent's skill x. Selector 150 then checks whether the agent's skill x work time exceeds that agent's target skill x work time, at step 504. If not, the agent is assigned to handle the selected call, at step 506, and the call-selection procedure is ended, at step 510. But if the agent's skill x work time exceeds the agent's target skill x work time, selector 150 causes the selected call to remain in the skill x call queue and the agent to remain idle and enqueued in agent queues 130 that correspond to the agent's skills, at step 508. The call-selection procedure then ends, at step 510.

Of course, various changes and modifications to the illustrative embodiment described above will be apparent to those skilled in the art. For example, use of the invention is not limited to use with ACD systems and agents, but may be used in any situations where calls are handled by a staff of call handlers. Or, any desired measure of deviation other than sum-of-squares deviation or variance may be employed. Such changes and modifications can be made without departing from the spirit and the scope of the invention and without diminishing its attendant advantages. It is therefore intended that such changes and modifications be covered by the following claims.

What is claimed is:

1. A method of selecting a call handler to handle a call, comprising the steps of:

in response to the call needing one of a plurality of skills for its handling, determining one of a plurality of available call handlers having the needed skill whose handling of the call would result in a smallest total deviation of per-skill ratios of an amount of time spent by the call handler in handling calls needing a skill (skill work time) and a total amount of time spent by the call handler in handling calls (staff time) from target per-skill ratios of skill work time and staff time; and assigning the determined call handler to handle the call.

2. The method of claim 1 wherein:

the step of assigning comprises the steps of determining whether the determined call handler's skill work time for the needed skill exceeds a target amount of time for handling calls needing the needed skill (target skill work time);

in response to a determination that the skill work time for the needed skill exceeds the target skill work time, forbearing from assigning the determined call handler to handle the call; and in response to a determination that the skill work time for the needed skill does not exceed the target skill work time, assigning the determined call handler to handle the call.

3. The method of claim 2 wherein:

the step of forbearing comprises the steps of leaving the call waiting for another call handler; and leaving the determined call handler idle.

4. The method of claim 1 wherein:

the step of determining comprises the steps of for each of said available call handlers having the needed skill, determining the call handler's per-skill skill work times, staff time, and per-skill target ratios of skill work time and staff time;

determining an expected handling time for a call needing the needed skill;

for each of said available call handlers having the needed skill, incrementing the call handler's skill work time for the needed skill and the staff time by the expected handling time;

for each of said available call handlers having the needed skill, determining a ratio of the incremented skill work time for the needed skill and the incremented staff time and further determining per-skill ratios of the skill work times for the call handler's skills other than the needed skill and the incremented staff time;

for each of said available call handlers having the needed skill, determining per-skill variances between the determined ratios and the target ratios;

for each of said available call handlers having the needed skill, combining the determined variances to obtain a total deviation; and determining the one call handler having the smallest total deviation.

5. The method of claim 1 wherein:

the method is performed for a call in response to the call becoming available.

6. A method of selecting a call for handling by a call handler, comprising the steps of:

in response to the call handler having a plurality of skills for handling calls, determining one of a plurality of available calls that need different ones of the call handler's skills whose handling by the call handler would result in a smallest total deviation of per-skill ratios of an amount of time spent by the call handler in handling calls needing a skill of the call handler (skill work time) and a total amount of time spent by the call handler in handling calls (staff time) from target per-skill ratios of skill work time and staff time; and assigning the call handler to handle the determined call.

7. The method of claim 6 wherein:

the step of assigning comprises the steps of determining whether the call handler's skill work time for the skill needed by the determined call exceeds a target amount of time for handling calls needing the needed skill (target skill work time);

in response to a determination that the skill work time for the skill needed by the determined call exceeds the target skill work time, forbearing from assigning the call handler to handle the determined call; and in response to a determination that the skill work time for the skill needed by the determined call does not exceed the target skill work time, assigning the call handler to handle the determined call.

8. The method of claim 7 wherein:

the step of forbearing comprises the steps of leaving the determined call waiting for another call handler; and leaving the call handler idle.

9. The method of claim 6 wherein:

the step of determining comprises the steps of determining skills of the call handler that are needed by the available calls;

for each of the needed skills, determining the call handler's per-skill skill work times and per-skill target ratios of skill work time and staff time;

determining the call handler's staff time;

for each of the needed skills, determining a corresponding expected handling time for a call needing that skill;

for each of the needed skills, incrementing the call handler's corresponding skill work time and the staff time by the corresponding expected handling time;

for each of the needed skills, determining a ratio of the corresponding incremented skill work time and the corresponding incremented staff time and further determining for the call handler's skills other than the corresponding skill per-skill ratios of the skill work times and the corresponding incremented staff time;

for each of the needed skills, determining variances between the per-skill corresponding determined ratios and the corresponding target ratios;

for each of the needed skills, combining the determined corresponding variances to obtain a corresponding total deviation; and determining the call needing the one skill having the smallest corresponding total deviation.

10. The method of claim 6 wherein:

the method is performed for a call handler in response to the call handler becoming available.

11. A method of matching calls that are available for handling with call handlers that are available to handle calls, comprising the steps of:

in response to a call needing one of a plurality of skills for its handling becoming available, selecting one of a plurality of available call handlers having the needed skill whose handling of the call would produce a least deviation from target performance criteria;

in response to a call handler having a plurality of skills for handling calls becoming available, selecting one of a plurality of available calls that need different ones of the available call handler's skills whose handling by the call handler would produce a least deviation from target performance criteria;

in response to either selection, determining whether an assignment of the agent to handle the call would increase deviation from the target performance criteria;

in response to a determination that the assignment would not increase the deviation, making the assignment; and in response to a determination that the assignment would increase the deviation, forbearing from making the assignment.

12. The method of claim 11 wherein:

the step of forbearing comprises the steps of leaving the call waiting for another call handler; and leaving the call handler idle.

13. The method of claim 11 wherein:

the step of determining whether an assignment of the agent to handle the call would increase deviation from the target performance criteria comprises determining whether the assignment would cause performance of the agent to exceed the target performance criteria;

the step of making the assignment comprises in response to a determination that the performance of the agent would not exceed the target performance criteria, making the assignment; and the step of forbearing from making the assignment comprises in response to a determination that the performance of the agent would exceed the target performance criteria, forbearing from making the assignment.

14. A method of matching calls that are available for handling with call handlers who are available to handle calls, comprising the steps of:

in response to a call needing one of a plurality of skills for its handling becoming available, determining one of a plurality of available call handlers having the needed skill whose handling of the call would result in a smallest total deviation of per-skill ratios of an amount of time spent by the call handler in handling calls needing a skill (skill work time) and a total amount of time spent by the call handler in handling calls (staff time) from target per-skill ratios of skill work time and staff time;

assigning the determined call handler to handle the call needing the one skill;

in response to a call handler having a plurality of skills for handling calls becoming available, determining one of a plurality of available calls that need different ones of the available call handler's skills whose handling by the available call handler would result in a smallest total deviation of per skill ratios of a corresponding skill work time and a corresponding staff time from target per-skill ratios of skill work time and staff time; and assigning the available call handler to handle the determined call.

15. The method of claim 14 wherein:

the step of assigning the determined call handler to handle the call needing the one skill comprises the steps of determining whether the determined call handler's skill work time for the one skill exceeds the determined call handler's target amount of time for handling calls needing the one skill (target skill work time), in response to a determination that the determined call handler's skill work time for the one skill exceeds the determined call handler's target skill work time for the one skill, forbearing from assigning the determined call handler to handle the call needing the one skill, and in response to a determination that the determined call handler's skill work time for the one skill does not exceed the determined call handler's target skill work time for the one skill, assigning the determined call handler to handle the call needing the one skill; and the step of assigning the available call handler to handle the determined call comprises the steps of determining whether the available call handler's skill work time for the skill needed by the determined call exceeds the available call handler's target skill work time for the needed skill, in response to a determination that the available call handler's skill work time for the needed skill exceeds the available call handler's target skill work time for the needed skill, forbearing from assigning the available call handler to handle the determined call, and in response to a determination that the available call handler's skill work time for the needed skill does not exceed the available call handler's target skill work time for the needed skill, assigning the available call handler to handle the determined call.

16. The method of claim 15 wherein:

the step of forbearing from assigning the determined call handler to handle the call needing the one skill comprises the steps of leaving the call needing the one skill waiting for another call handler, and leaving the determined call handler idle; and the step of forbearing from assigning the available call handler to handle the determined call comprises the steps of leaving the determined call waiting for another call handler, and leaving the available call handler idle.

17. An apparatus that performs the method of claim 1 or 2 or 3 or 4 or 5 or 6 or 7 or 8 or 9 or 10 or 11 or 12 or 14 or 15 or 16 or 13.

18. A computer-readable medium containing software which, when executed in a computer, causes the computer to perform the steps of claim 1 or 2 or 3 or 4 or 5 or 6 or 7 or 8 or 9 or 10 or 11 or 12 or 14 or 15 or 16 or 13.

19. An apparatus for selecting a call handler to handle a call, comprising:

an effector, responsive to the call needing one of a plurality of skills for its handling, of determining one of a plurality of available call handlers having the needed skill whose handling of the call would result in a smallest total deviation of per-skill ratios of an amount of time spent by the call handler in handling calls needing a skill (skill work time) and a total amount of time spent by the call handler in handling calls (staff time) from target per-skill ratios of skill work time and staff time; and an effector of assigning the determined call handler to handle the call.

20. The apparatus of claim 19 wherein:

the effector of assigning comprises an effector of determining whether the determined call handler's skill work time for the needed skill exceeds a target amount of time for handling calls needing the needed skill (target skill work time); and an effector, responsive to a determination that the skill work time for the needed skill exceeds the target skill work time, of forbearing from assigning the determined call handler to handle the call, and responsive to a determination that the skill work time for the needed skill does not exceed the target skill work time, of assigning the determined call handler to handle the call.

21. An apparatus for selecting a call for handling by a call handler, comprising:

an effector, responsive to the call handler having a plurality of skills for handling calls, of determining one of a plurality of available calls that need different ones of the call handler's skills whose handling by the call handler would result in a smallest total deviation of per-skill ratios of an amount of time spent by the call handler in handling calls needing a skill of the call handler (skill work time) and a total amount of time spent by the call handler in handling calls (staff time) from target per-skill ratios of skill work time and staff time; and an effector of assigning the call handler to handle the determined call.

22. The apparatus of claim 21 wherein:

the effector of assigning comprises an effector of determining whether the call handler's skill work time for the skill needed by the determined call exceeds a target amount of time for handling calls needing the needed skill (target skill work time); and an effector, responsive to a determination that the skill work time for the skill needed by the determined call exceeds the target skill work time, of forbearing from assigning the call handler to handle the determined call, and responsive to a determination that the skill work time for the skill needed by the determined call does not exceed the target skill work time, of assigning the call handler to handle the determined call.

23. An apparatus for matching calls that are available for handling with call handlers that are available to handle calls, comprising:

an effector, responsive to a call needing one of a plurality of skills for its handling becoming available, of selecting one of a plurality of available call handlers having the needed skill whose handling of the call would produce a least deviation from target performance criteria, and further responsive to a call handler having a plurality of skills for handling calls becoming available, of selecting one of a plurality of available calls that need different ones of the available call handler's skills whose handling by the call handler would produce a least deviation from target performance criteria;

an effector, responsive to either selection by the selecting effector, of determining whether an assignment of the agent to handle the call would increase deviation from the target performance criteria; and an effector, responsive to a determination by the determining effector that the assignment would not increase the deviation, of making the assignment, and further responsive to a determination by the determining effector that the assignment would increase the deviation, of forbearing from making the assignment.

24. The apparatus of claim 23 wherein:

the effector of making and of forbearing responds to the determination that the assignment would increase the deviation by leaving the call waiting for another call handler and leaving the call handler idle.

25. The apparatus of claim 23 wherein:

the effector of determining whether an assignment of the agent to handle the call would increase deviation from the target performance criteria determines whether the assignment would cause performance of the agent to exceed the target performance criteria; and the effector of making the assignment makes the assignment responsive to a determination that the performance of the agent would not exceed the target performance criteria, and forbears from making the assignment responsive to a determination that the performance of the agent would exceed the target performance criteria.

* * * * *